March 22, 1966 W. R. LINCOURT 3,241,352
PULL CLAMP
Filed Dec. 29, 1964

INVENTOR.
WILLIAM R. LINCOURT
BY
Barlow & Barlow
ATTORNEYS

United States Patent Office 3,241,352
Patented Mar. 22, 1966

3,241,352
PULL CLAMP
William R. Lincourt, 138 Coggeshall Ave.,
Newport, R.I.
Filed Dec. 29, 1964, Ser. No. 421,926
5 Claims. (Cl. 72—457)

This application is a continuation-in-part of my application Ser. No. 139,442, filed Sept. 20, 1961.

This invention relates to a pull clamp of the type particularly adapted for use in straightening bodies and related parts of automobiles.

Clamps which have been heretofore used for pulling sheet metal usually have some sort of a pivoted bail connected to the clamp so that the pull is always directed through the same location on the clamp, and when it is necessary to pull in a direction where the bail is at an angle to the jaws of the clamp, frequently the entire clamp will pivot about one end of the jaws and will come loose, losing its gripping power.

The pull clamp of this invention comprises a single pair of jaws of substantial area to grip the work with a body part extending from the jaws and lengthwise beyond the jaw with an arrangement for attaching a pulling means at selected locations through an arc of about 90° so that the pull may be directed through the mid portion of the pair of jaws to maintain a generally balanced relation of grip of the jaws on either side of the direction of pull.

One of the objects of this invention is to provide a single clamp which enables the user to pull in a plurality of different directions without loosening the clamp.

Another object of the invention is to so direct the location of pull that it will pass substantially through the mid portion of one pair of the jaws so that their gripping relation will be maintained.

Another object of this invention is to provide a plurality of locations, any one of which may be selected so as to direct the pull through the mid portion of the clamping area of one pair of jaws whereby a near balanced relation may be had with relation to the gripping surfaces enabling them to better maintain a grip upon the work.

With these and other objects in view, the invention consists of certain novel features of construction as will be more fully described and particularly pointed out in the appended claims.

In proceeding with this invention, I have provided a clamp body having jaws at one edge extending lengthwise of the body but only along a portion of the body with a means to move the jaws toward each other. At spaced locations along the body, there are provided a plurality of different points for attachment for some pulling means. In this instance the points of attachment are provided by openings through the body at spaced locations. The locations are generally in the form of an arc extending over a quadrant of about 90° so that pull may be located at various points of this quadrant in a direction which will pass through substantially the mid portion of the gripping area of the jaws. By variously positioning the clamp, any one of the four quadrants of 360° may be utilized.

Figure 1:
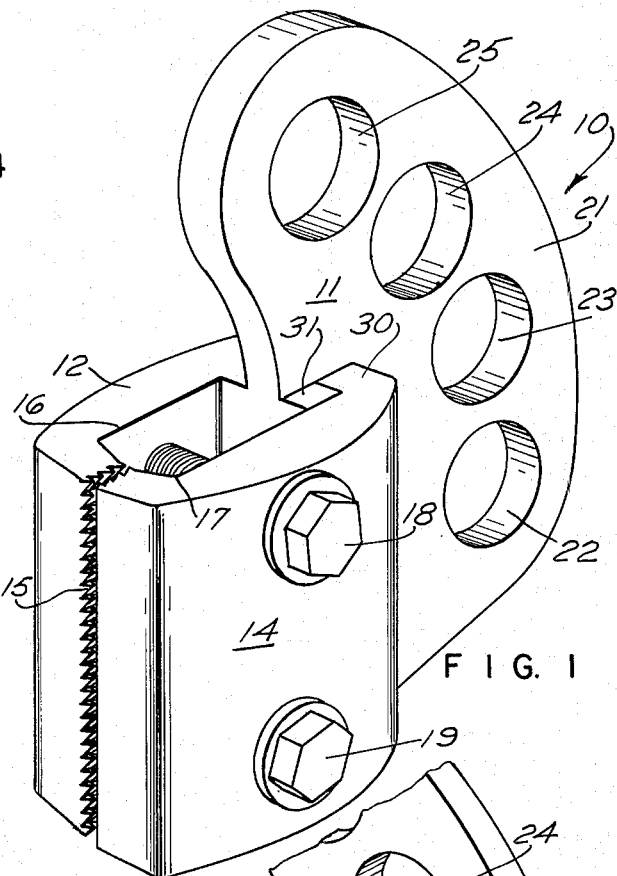
FIG. 1 is a perspective view of the pull clamp which is the subject of this invention looking at the front of the jaws.
Figure 2:
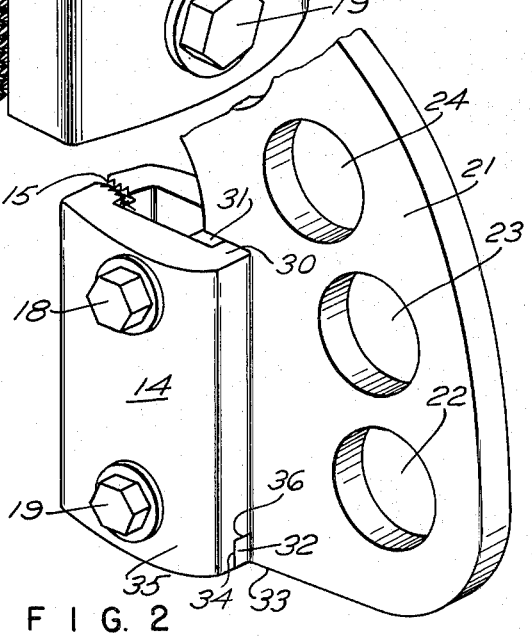
FIG. 2 is a fragmental perspective view of the pull clamp looking at the back of the jaws.

With reference to the drawings, 10 designates generally the body of the pull clamp which is shaped as best shown in FIG. 1. The body comprises an arcuate fin-like sector 11 which is provided with an offset jaw 12 which may be cast integral with the body 11. A separate companion jaw 14 of generally the same outline as the jaw 12 cooperates therewith. These jaws are each serrated as shown at 15 and are complemental so as to provide a clamping or gripping area in generally the plane of the body of substantial length and breadth. Each of these jaws is arched or cut away from the center plane at 16 and 17 at a point just inwardly from the gripping areas of the jaws to provide an open throat to accommodate lips or flanges, and through this arched-away portion there are bolts 18 and 19 having heads at one end engaging part 14 with threaded shanks 20 threadingly engaging openings in the other part 12 for urging the jaws 12 and 14 toward each other to clamp a piece of work W between them.

Along the opposite edge portion 21 of the body which extends a substantial distance lengthwise of the body beyond the jaws, I have located a plurality of openings 22, 23, 24 and 25 in the body 11. The openings 22, 23, 24 and 25 provide a means for attaching some pulling means which attachment may be by means of a hook or loop passed through any selected one of these openings or a pair of openings. Depending upon the opening or openings selected, the direction of pull will be differently directed with reference to the clamping jaws.

The jaw 14 is provided with a flange 30 to hook over a rib 31 formed integral with the body 11 and extends therefrom in a direction opposite to the offset of the jaw 12. This rib 31 thus transmits pull on the body through flange 30 to the jaw 14. A second rib 32 at right angles to rib 31 extends along edge 33 of the body and is integral with the body. This rib enters recess 34 in the lower edge 35 of jaw 14 and engages shoulder 36 to transmit lengthwise pull on the body to the jaw 14 through shoulder 36.

Figure 4:
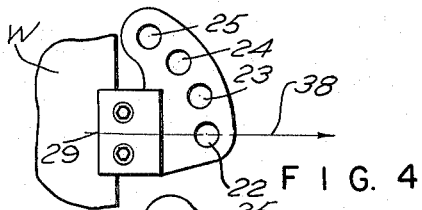
FIGS. 4 to 10 are diagrammatic views illustrating the relation of the clamp to the piece of work being acted upon and the direction of the pull at the different locations depending upon the selected point of attachment.

In FIG. 4, I have illustrated the clamping jaws as engaging a piece of work W, and in this instance it is desired that the pull shall be on the work in the direction of the arrow 38. In order to accomplish this, the pulling means will be passed through the opening 22 so that a projected line from the direction of the pull through opening 22 will pass through the mid point 29 of the jaws. It will also pass between the points 18 and 19 of moving the jaws toward each other. Thus, I will provide a balanced relation for a pull in the direction shown by arrow 38 with reference to the gripping areas of the jaws.

Figure 6:
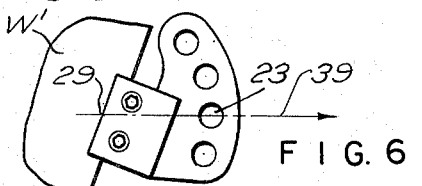

In some instances a different relationship of work and direction of pull is required, and such a different angle is shown at W' in FIG. 6, and in this instance the direction of pull shown by arrow 39 is desired and will be had by attachment to the opening 23 of the clamp. In this case a projected line from the direction of pull 39 is from the center of the opening 23 and will pass through the mid point 29 of the jaws as shown in FIG. 6, thus providing a balanced relation of pull to jaws in a different direction with reference to the work and yet one which passes through the center of the jaws, it being apparent that if the pull in this instance were by attachment to the opening 22, the pull would not pass through the center of the gripping area of the jaws but would rather tend to swing the jaws about one end of their gripping surface.

Figure 8:
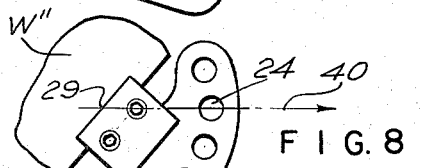

In FIG. 8 I have illustrated a still different arrangement of direction of pull relative to the work W''. The jaws 12, 14 are attached to this edge W″ of the work. The direction of the pull desired is as shown by arrow 40, and in this case the pull by reason of selecting the attachment at the location 24 will pass through the mid point 29 of the areas of the jaws, it being seen that if the pull were in either of the other locations heretofore described 22, 23, even greater leverage to pull the clamp from the work would be had.

Figure 10:
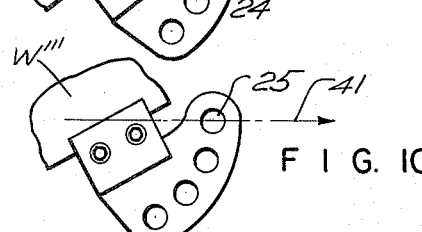
Figure 3:
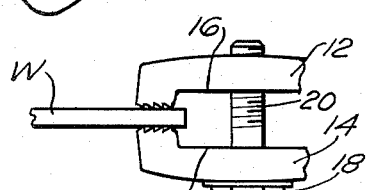
FIG. 3 is a sectional view through a portion of the clamp showing the means for moving the jaws toward each other.

A still different relation is shown in FIG. 10. Here the jaws are shown as attached to a piece of work W‴ to which it is desired to apply a still different angle of pull. In this case the pull as shown by arrow 41 will be had by attachment of the pulling means to the location 25, and in this case the projected line of pull will still pass through the center 29 of the jaws so that the jaws will be maintained in gripping relation with the work, even though the pull is at a very small acute angle with reference to the general longitudinal extent of the jaws.

Figure 5:
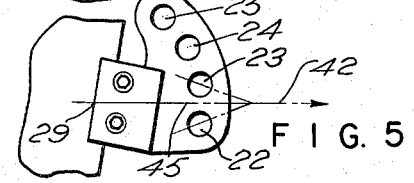
Figure 7:
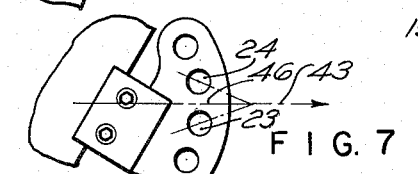
Figure 9:
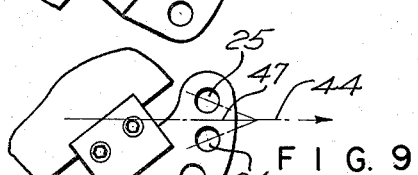

Intermediate different relations may be obtained as seen in FIGS. 5, 7 and 9 by directing the pull as seen by arrow 42 in FIG. 5 showing the direction of pull between openings 22 and 23 and through mid point 29 by connecting the direction of pull to both openings by looping the pulling chain through both openings and about the web portion 45 between them. Similarly pull in FIG. 7 as seen by arrow 43 may be directed between openings 23 and 24 by looping a chain about web 46 or a pull in FIG. 9 may be directed between openings 24 and 25 by looping a chain about web 47.

In each of these cases the pull is substantially through the mid point of the jaws which assists in the balanced relation desired.

I claim:

1. A pull clamp comprising a body having at one edge thereof and for a portion of the extent thereof a pair of jaws having a substantial clamping area with the body extending as an unsupported fin lengthwise of the gripping area of the jaws beyond the end of the jaws, clamping means to move the jaws toward each other to clamp a piece of work between them, said body having means for attaching a pulling means at a plurality of spaced locations extending lengthwise of the gripping area of the jaws at an edge of said body and beyond the clamping means, said locations being arranged with reference to the mid portion of the clamping area of said jaws so that a pull may be directed through the mid portion of said clamping area from a plurality of different directions with respect to the body of the clamp depending upon the selected location chosen for the attachment of the pulling means.

2. A pull clamp as in claim 1 wherein the means to move the jaws toward each other are spaced and located on either side of the mid portion of the clamping area of the jaws.

3. A pull clamp as in claim 1 wherein the plurality of spaced locations for attachment of the pulling means are arcuately arranged.

4. A pull clamp as in claim 1 wherein the plurality of spaced locations for attachment of the pulling means are arcuately arranged over a quadrant of substantially 90° and arched over a portion of the end of the jaws.

5. A pull clamp as in claim 1 wherein there is an interfit relation between the body and separate jaw to transmit pull from the body to the jaw.

References Cited by the Examiner
UNITED STATES PATENTS

| 2,608,730 | 9/1952 | Killins | 153—32 |
| 3,131,747 | 5/1964 | Junkins | 153—32 |

CHARLES W. LANHAM, *Primary Examiner.*